US011981292B2

United States Patent
Liu et al.

(10) Patent No.: US 11,981,292 B2
(45) Date of Patent: May 14, 2024

(54) FOLDABLE AND RETRACTABLE COVERING CURTAIN

(71) Applicant: Kunshan Yuqiu Molding Plastics Co., Ltd, Suzhou (CN)

(72) Inventors: Annie Liu, Suzhou (CN); Qicai Fang, Suzhou (CN)

(73) Assignee: Kunshan Yuqiu Molding Plastics Co., Ltd, Suzhou (CN)

( * ) Notice: Subject to any disclaimer, the term of this patent is extended or adjusted under 35 U.S.C. 154(b) by 964 days.

(21) Appl. No.: 16/965,588

(22) PCT Filed: Nov. 16, 2017

(86) PCT No.: PCT/CN2017/111355
§ 371 (c)(1),
(2) Date: Jul. 28, 2020

(87) PCT Pub. No.: WO2019/085034
PCT Pub. Date: May 9, 2019

(65) Prior Publication Data
US 2021/0046879 A1    Feb. 18, 2021

(30) Foreign Application Priority Data

Nov. 2, 2017  (CN) .......................... 201711064571.1

(51) Int. Cl.
*B60R 5/04*    (2006.01)
(52) U.S. Cl.
CPC .................................. *B60R 5/047* (2013.01)
(58) Field of Classification Search
CPC ........... B60R 5/047; E04F 10/10; E04F 10/06
See application file for complete search history.

(56) References Cited

U.S. PATENT DOCUMENTS 6,213,186 B1 *   4/2001  Torres .................... B60J 1/2038
                                                                  296/37.16
7,137,177 B2 *  11/2006  Fujii .................... A44B 19/386
                                                                     24/433
(Continued)

FOREIGN PATENT DOCUMENTS

CN           2875250 Y      3/2007
CN         103643884 A      3/2014
(Continued)

OTHER PUBLICATIONS

International Search Report and Written Opinion issued in PCT/CN2017/1113557; dated Jul. 31, 2018 and English translation thereof.

*Primary Examiner* — Beth A Stephan
(74) *Attorney, Agent, or Firm* — ARC IP Law, PC; Joseph J. Mayo

(57) ABSTRACT

A foldable and recyclable covering curtain, that can be folded along a length direction, which includes outer tubes and inner ends of the outer tubes connected by a rotating structure. The outer tubes are folded or opened into a straight line by the rotating structure, and one side of each outer tube is provided with an interval groove. The curtain includes a curtain fabric provided inside each outer tube, and the curtain fabrics extend outward to the outer tube by the interval groove. When the curtain fabric is unfolded, opposite sides of the curtain fabrics are closed using a zipper mechanism. When the curtain fabric is folded, the zipper mechanism is opened. Two sides of the outer end of each curtain fabric in the unfolded state are provided with a pair of side tube plugs, and each pair of side tube plugs is inserted with a corresponding side tube.

7 Claims, 4 Drawing Sheets

(56) References Cited

U.S. PATENT DOCUMENTS

| | | | | |
|---|---|---|---|---|
| 7,806,453 B2 * | 10/2010 | Aebker | ............... | B60R 11/00 |
| | | | | 296/37.16 |
| 8,707,524 B2 * | 4/2014 | Wang | ............... | A44B 19/24 |
| | | | | 24/396 |
| 10,471,898 B2 * | 11/2019 | Murray | ............... | E06B 9/80 |
| 2002/0069980 A1 * | 6/2002 | Floyd | ............... | E06B 9/40 |
| | | | | 160/370.22 |
| 2013/0062905 A1 * | 3/2013 | Held | ............... | B60J 5/08 |
| | | | | 296/141 |
| 2014/0041815 A1 | 2/2014 | Kao | | |
| 2016/0325686 A1 * | 11/2016 | Krishnan | ............... | B60R 5/047 |

FOREIGN PATENT DOCUMENTS

| | | | | |
|---|---|---|---|---|
| CN | 205971093 U | | 2/2017 | |
| CN | 107021024 A | | 8/2017 | |
| CN | 107089197 A | | 8/2017 | |
| CN | 113352992 A | * | 9/2021 | ............... B60R 5/04 |
| JP | 2001030833 A | | 2/2001 | |

* cited by examiner

FOLDABLE AND RETRACTABLE COVERING CURTAIN

CROSS-REFERENCE TO RELATED APPLICATIONS

This application is a national stage filing under 35 U.S.C. § 371 of International Application Number PCT/CN2017/111355, filed Nov. 16, 2017, which claims priority to Chinese Patent Application No. 201711064571.1 filed Nov. 2, 2017. The contents of these applications are incorporated herein by reference in their entirety.

BACKGROUND OF THE INVENTION

Field of the Invention

The present invention relates to the technical field of covering curtain structures, and in particular to a foldable and retractable covering curtain.

Description of the Related Art

Covering curtain may be applied for automobile interiors, which integrates the aesthetic and practical functions. However, for the existing covering curtain, after it is rolled up, a handle part and part of the curtain body protrude forward, which in turn makes the space of a rear trunk disturbed to some extent when a large luggage is placed into the space later. Furthermore, when an even larger luggage needs to be placed into the space, the covering curtain needs to be detached, and at this time, the length of the detached covering curtain makes it difficult to store, which affects the space of the rear trunk.

BRIEF SUMMARY OF THE INVENTION

In view of the above problem, the present invention provides a foldable and retractable covering curtain, which allows the retracted covering curtain to be folded along a length direction of outer tubes to ensure that the covering curtain occupies a small and is easy to store.

A foldable and retractable covering curtain, which includes: two outer tubes; wherein inner ends of the two outer tubes in a length direction are connected by a rotating structure, the two outer tubes are folded or unfolded into a straight line structure by the rotating structure; wherein a corresponding spacing groove is provided at one side of each outer tube in the length direction; wherein a curtain fabric that is capable of being rolled up is provided inside each outer tube, and each curtain fabric extends outside of the corresponding outer tube by the corresponding spacing groove; and wherein when the curtain fabric is in an expanded state, the facing sides of the two curtain fabrics are in closed connection by a zipper mechanism, and when the curtain fabric is in a retracted state, the zipper mechanism is opened; and wherein a pair of side tube plugs are respectively provided at two sides of an outer end of each curtain fabric in the expanded state, and a corresponding side tube is inserted between each pair of side tube plugs.

The foldable and retractable covering curtain is further characterized in that:

the two outer tubes are respectively a left outer tube and a right outer tube, corresponding left outer and left middle caps are installed on both ends of the left outer tube in a length direction, and right outer and right middle caps are installed on both ends of the right outer tube in the length direction, a left curtain fabric is provided inside the left outer tube, a right curtain fabric is provided inside the right outer tube, and the left middle cap and the right middle cap which are adjacently arranged are connected through a rotating mechanism;

the rotating mechanism includes a button, a spring and a gear end cover, the left middle cap includes a first round mounting boss protruding backward, the right middle cap includes a second round mounting boss protruding backward, the first round mounting boss and the second round mounting boss are centrally arranged in forward and backward directions, mating end faces of the first round mounting boss and the second round mounting boss form an inner cavity, the first round mounting boss is provided with a first annular gear groove structure in a position corresponding to the inner cavity, and the second round mounting boss is provided with a second annular gear groove structure in a position corresponding to the inner cavity, the first and second annular gear groove structures are centrally arranged in forward and backward directions to form an integral annular gear groove, a gear end cover is engaged in the annular gear groove, the gear of the gear end cover is meshed with the gear groove of the annular gear groove, the gear end cover has a thickness smaller than that of the first and second annular gear groove structures, the spring is arranged between an inner end face of the gear end cover and an inner wall end face of the inner cavity, an outer end face of the gear end cover is provided with the button by press fit, the button is axially positioned in a button mounting guide slot of the round mounting boss located at a rear portion, and a force application surface of the button is exposed;

a guide sleeve is arranged at a central axis position of the first round mounting boss, a central through hole is arranged in the guide sleeve, the guide sleeve is connected with an inner wall of the first round mounting boss through connecting ribs at two sides, a button stop ring is arranged at a rear end face of the first round mounting boss, a threaded sleeve pillar which protrudes backward is arranged at a central axis of the second round mounting boss, a threaded hole is arranged at a central hole position of the threaded sleeve pillar, the threaded sleeve pillar protrudes backward and thus is inserted into the central through hole of the guide sleeve, the gear end cover is sleeved on an outer ring surface of the threaded sleeve pillar, a bolt is threadedly connected with the threaded hole from back to front, and a head of the bolt is arranged closely abutting against a rear end surface of the guide sleeve;

an axial force applying ring of the button is provided with a long relief groove at a position corresponding to the connecting rib, an outer end face of the axial force applying ring of the button protrudes laterally to form a stop strip, the stop strip has an outer diameter larger than that of the button stop ring, due to the presence of the long relief groove the stop strip is located at an inner end of the button stop ring after being pressed, and the stop strip is arranged closely abutting against an outer end face of the gear end cover;

the zipper mechanism includes zipper tapes at two sides and a zipper head, wherein the zipper tapes are seamlessly connected with corresponding facing sides of the curtain fabrics respectively, and the zipper head is pulled from outside to inside to close the zipper tapes at the two sides;

at least one end face of the left middle cap and the right middle cap facing the side tube is provided with a corresponding buckle, and an end of the zipper head is placed into the buckle when the curtain fabric is in an expanded state;

each pair of side tube plugs includes inner and outer side tube plugs, two of the inner side tube plugs are combined to form an integral connecting mechanism, and the facing sides of the curtain fabrics on both sides are clamped in two sides of the connecting mechanism, respectively;

a combined latch structure is arranged at a corresponding position of the front end face of the connecting mechanism, the latch of the latch structure is provided with a linear driving end which is used for opening the latch structure, so that the connecting mechanism is separated into individual inner side tube plugs.

Beneficial effects of the present invention:

By adopting the above technical scheme, the zipper mechanism is opened to allow the curtain fabrics at both sides of the zipper mechanism to become independent of each other, then the curtain fabrics are rolled up, and the outer tubes at both ends are folded by the rotating structure, which enables the retracted covering curtain to be folded along the length direction of the outer tube to ensure that the covering curtain occupies a small space and is easy to store.

The designations corresponding to the serial numbers in the figures are as follows:

1 rotating structure or mechanism, 2 spacing groove, 3 curtain fabric, 4 zipper mechanism, 5 side tube, 6 left outer tube, 7 right outer tube, 8 left outer cap, 9 left middle cap, 10 right outer cap, 11 right middle cap, 12 button, 13 spring, 14 gear end cover, 15 first round mounting boss, 16 second round mounting boss, 17 first annular gear groove structure, 18 second annular gear groove structure, 19 force application surface, 20 guide sleeve, 21 central through hole, 22 connecting rib, 23 button mounting guide slot, 24 button stop ring, 25 threaded sleeve pillar, 26 threaded hole, 27 bolt, 28 axial force applying ring, 29 long relief groove, 30 stop strip, 31 zipper tape, 32 zipper head, 33 buckle, 34 outer side tube plug, 35 connecting mechanism, 36 latch structure, and 37 linear driving end.

DETAILED DESCRIPTION OF THE INVENTION

Figure 1:
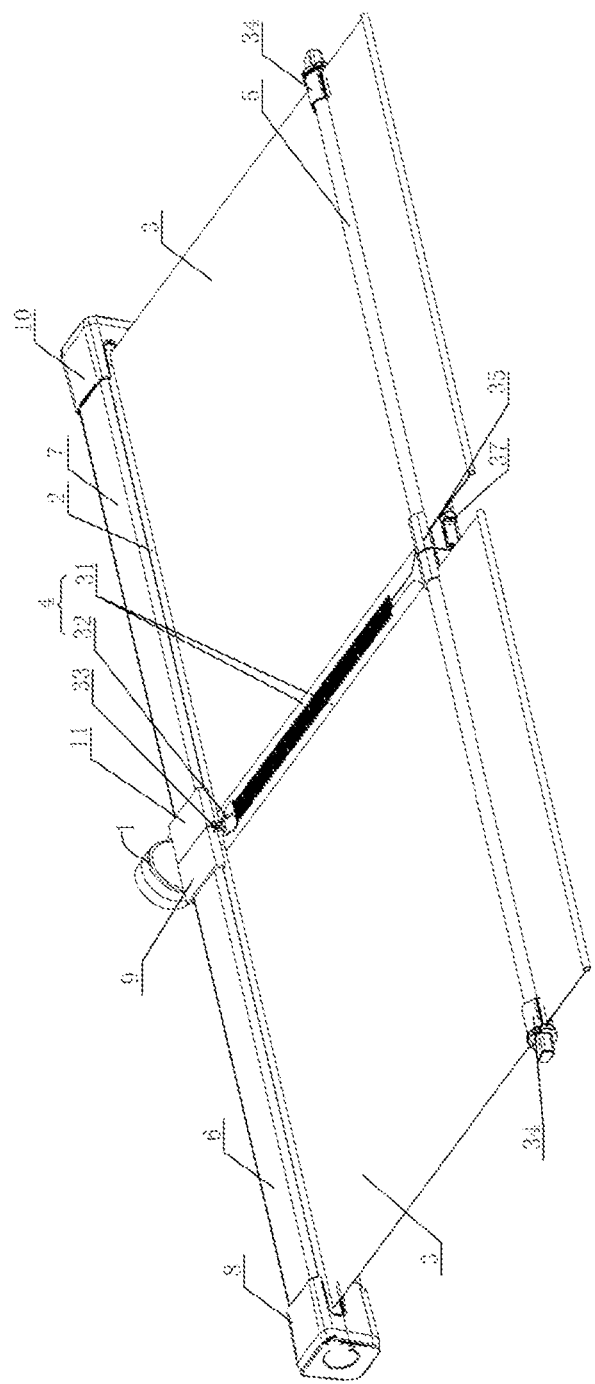
FIG. 1 is a schematic structural perspective diagram of a curtain fabric in an expanded state according to the present invention.
Figure 2:
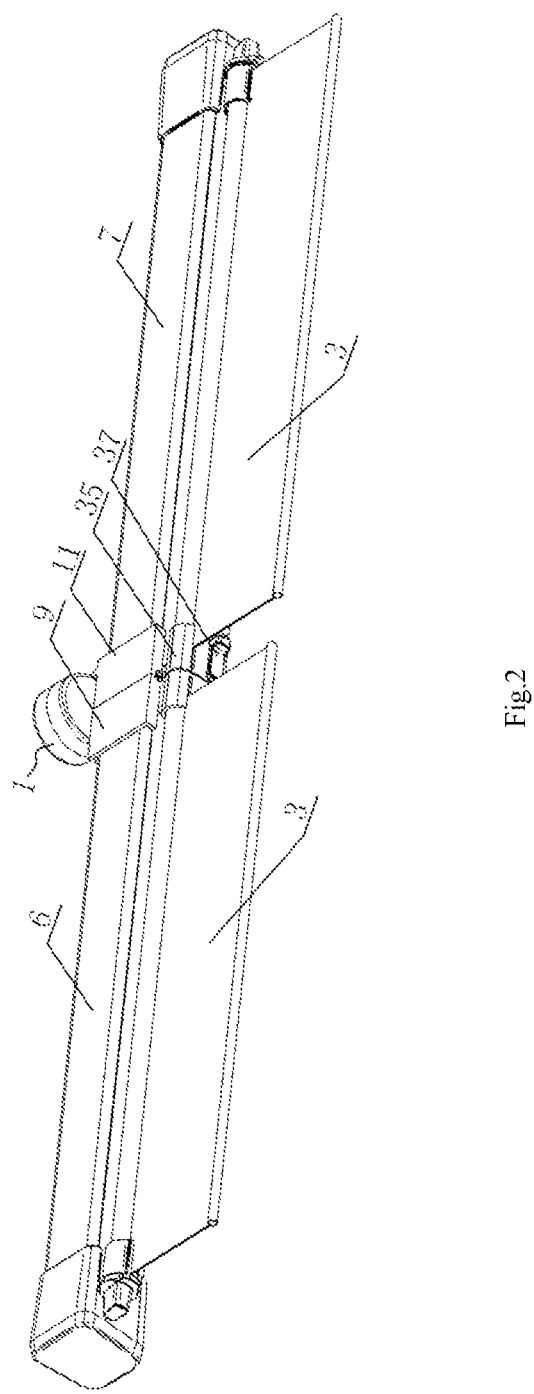
FIG. 2 is a schematic structural perspective diagram of a curtain fabric in a retracted state but is unfolded according to the present invention.
Figure 3:
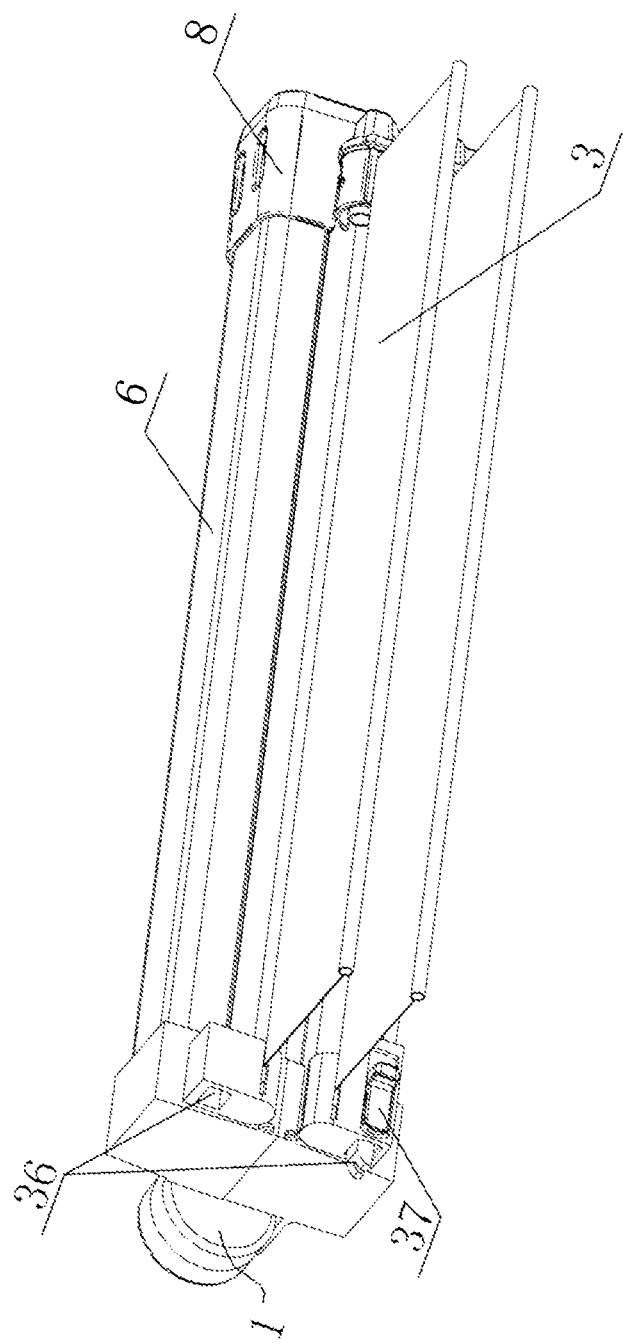
FIG. 3 is a schematic structural perspective diagram of a curtain fabric in a retracted state and is folded according to the present invention.
Figure 4:
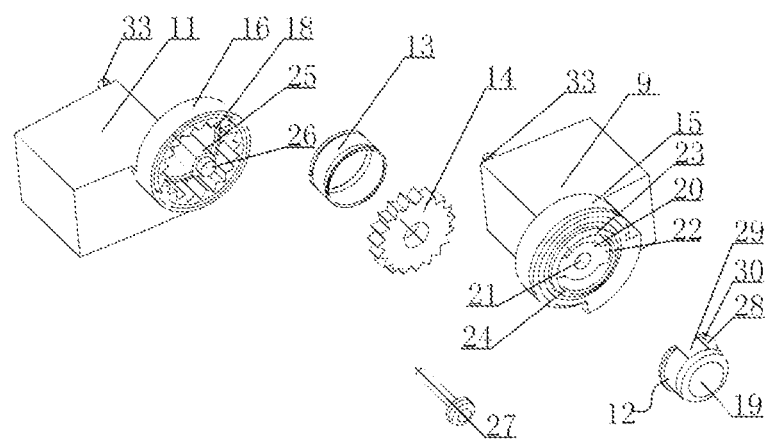
FIG. 4 is an exploded schematic diagram of a rotating structure according to the present invention.
Figure 5:
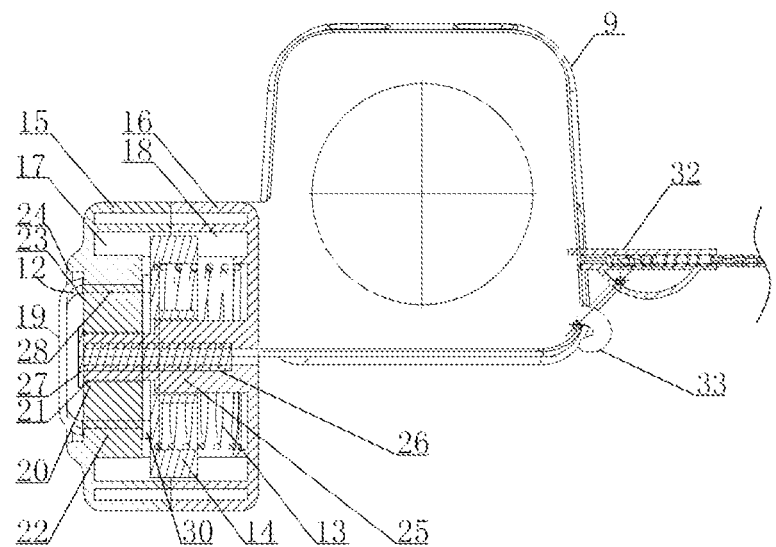
FIG. 5 is a schematic cross-sectional diagram of a curtain fabric rotating mechanism after assembly according to the present invention.

Referring to FIGS. 1-5, a foldable and retractable covering curtain includes two outer tubes. Inner ends of the two outer tubes in a length direction are connected by a rotating structure. The two outer tubes are folded or unfolded into a straight line by a rotating structure 1. A corresponding spacing groove 2 is provided at one side of each outer tube in the length direction. A curtain fabric 3 that can be rolled up is provided inside each outer tube, and each curtain fabric 3 extends outside of the corresponding outer tube by the corresponding spacing groove 2. When the curtain fabric is expanded, facing sides of the two curtain fabrics 3 are in closed connection by a zipper mechanism 4, and when the curtain fabric 3 is folded, the zipper mechanism 4 is opened, and two sides of an outer end of each curtain fabric 3 in the expanded state are provided with a pair of side tube plugs, and a corresponding side tube 5 is inserted between each pair of side tube plugs.

The two outer tubes are respectively a left outer tube 6 and a right outer tube 7. Corresponding left outer and left middle caps 8 and 9 are installed on both ends of the left outer tube 6 in a length direction, and right outer and right middle caps 10 and 11 are installed on both ends of the right outer tube 7 in the length direction. A left curtain fabric is provided inside the left outer tube 6. A right curtain fabric is provided inside the right outer tube 7. The left middle cap 9 and the right middle cap 11 which are adjacently arranged are connected through a rotating structure or mechanism 1.

The rotating structure or mechanism 1 includes a button 12, a spring 13 and a gear end cover 14. The left middle cap 9 includes a first round mounting boss 15 protruding backward. The right middle cap 11 includes a second round mounting boss 16 protruding backward. The first round mounting boss 15 and the second round mounting boss 16 are centrally arranged in forward and backward directions. Mating end faces of the first round mounting boss 15 and the second round mounting boss 16 form an inner cavity. The first round mounting boss 15 is provided with a first annular gear groove structure 17 in a position corresponding to the inner cavity. The second round mounting boss 16 is provided with a second annular gear groove structure 18 in a position corresponding to the inner cavity. The first and second annular gear groove structures 17 and 18 are centrally arranged in forward and backward directions to form an integral annular gear groove. A gear end cover 14 is engaged in the annular gear groove. The gear of the gear end cover 14 is meshed with the gear groove of the annular gear groove. The gear end cover 14 has a thickness smaller than that of the first and second annular gear groove structures 17 and 18. The spring 13 is arranged between an inner end face of the gear end cover 14 and an inner wall end face of the inner cavity. An outer end face of the gear end cover 14 is provided with the button 12 by press fit. The button 12 is axially positioned in a button mounting guide slot 23 of the round mounting boss located at a rear portion. A force application surface 19 of the button 12 is exposed.

A guide sleeve 20 is arranged at a central axis position of the first round mounting boss 15. A central through hole 21 is arranged in the guide sleeve 20. The guide sleeve 20 is connected with an inner wall of the first round mounting boss 15 through connecting ribs 22 at two sides. A button stop ring 24 is arranged at a rear end face of the first round mounting boss 15. A threaded sleeve pillar 25 which protrudes backward is arranged at a central axis of the second round mounting boss 16. A threaded hole 26 is arranged at a central hole position of the threaded sleeve pillar 25. The threaded sleeve pillar 25 protrudes backward and thus is inserted into the central through hole 21 of the guide sleeve 20. The gear end cover 14 is sleeved on an outer ring surface of the threaded sleeve pillar 25. A bolt 27 is threadedly connected with the threaded hole 26 from back to front. A head of the bolt 27 is arranged closely abutting against a rear end surface of the guide sleeve 20.

An axial force applying ring 28 of the button 12 is provided with a long relief groove 29 at a position corresponding to the connecting rib 22. An outer end face of the axial force applying ring 28 of the button 12 protrudes laterally to form a stop strip 30. The stop strip 30 has an outer diameter larger than that of the button stop ring 24. Due to the presence of the long relief groove 29, the stop strip 30 is located at an inner end of the button stop ring 24 after being pressed. The stop strip 30 is arranged closely abutting against an outer end face of the gear end cover 12.

When the two middle caps are in a locked state, the spring 13 is mounted on the top of the gear end cover 14. The thickness direction of the gear end cover 14 is located at a transition position between the first annular gear groove structure 17 and the second annular gear groove structure 18. When rotation is required, the button 12 is pressed so that the gear end cover 14 can rotate just by engaging the second annular gear groove structure 18.

The zipper mechanism 4 includes zipper tapes 31 at two sides and a zipper head 32, wherein the respective zipper tapes 31 are seamlessly connected with the facing sides of the corresponding curtain fabrics 3 respectively, and the zipper head 32 pull from outside to inside to close the zipper tapes 31 at the two sides.

At least one end face of the left middle cap 9 and the right middle cap 11 facing the side tube is provided with a corresponding buckle 33, and an end of the zipper head 32 is placed into the buckle 33 when the curtain fabric 3 is in an expanded state.

Each pair of side tube plugs includes inner and outer side tube plugs 34, two of the inner side tube plugs are combined to form an integral connecting mechanism 35, and the facing sides of the curtain fabrics 3 on both sides are clamped in two sides of the connecting mechanism 35, respectively.

A combined latch structure 36 is arranged at a corresponding position of the front end face of the connecting mechanism 35, the latch of the latch structure 36 is provided with a linear driving end 37 which is used for opening the latch structure, so that the connecting mechanism 35 is separated into individual inner side tube plugs.

In a specific embodiment, the left curtain fabric and the right curtain fabric are side curtain fabrics with the same size, and the left outer tube 6 and the right outer tube 7 have the same length and are the same outer tubes.

The working principle of the specific embodiment is as follows: when the curtain cloth is in an expanded state, the zipper mechanism is closed, the side tubes on both sides are inserted into a corresponding pair of side tube plugs, and the latch structure of the connecting mechanism is in a locked state; and when it is required to retract the curtain fabrics, the zipper mechanism is opened, the zipper head opens the curtain fabrics on both sides from inside to outside and thus the curtain fabric is retracted, then the linear driving end is driven to open the latch structure, thereafter the button is pressed to fold the two outer tubes to complete the folding of the covering curtain, and then the button is released to keep the folded state.

The specific embodiments of the present invention have been described in detail above, but the content is only a preferred embodiment of the present invention, and cannot be considered as limiting the implementation scope of the present invention. All equivalent changes and improvements made in accordance with the application scope of the present invention shall still fall within the scope covered by this patent.

What is claimed is:

1. A foldable and retractable covering curtain, comprising: two outer tubes;
   wherein inner ends of the two outer tubes in a length direction are connected, the two outer tubes are folded or unfolded into a straight line structure by a rotating mechanism;
   wherein a corresponding spacing groove is provided at one side of each outer tube of the two outer tubes in the length direction;
   wherein a curtain fabric that is capable of being rolled up is provided inside each outer tube of the two outer tubes, and each of the curtain fabrics inside said two outer tubes extends outside of the corresponding outer tube by the corresponding spacing groove;
   wherein when each of the curtain fabrics is in an expanded state, facing sides of the curtain fabrics are in closed connection by a zipper mechanism, and when each of the curtain fabrics is in a retracted state, the zipper mechanism is opened;
   wherein a pair of side tube plugs are respectively provided at one of the facing sides and an opposite side thereof of each of said curtain fabrics in the expanded state, and a corresponding side tube is inserted between each of said pair of side tube plugs provided at said one of the facing sides and said opposite side thereof;
   wherein the two outer tubes are respectively a left outer tube and a right outer tube, corresponding left outer cap and left middle cap are installed on both ends of the left outer tube in the length direction, and a right outer cap and right middle cap are installed on both ends of the right outer tube in the length direction, a left curtain fabric of the curtain fabrics is provided inside the left outer tube, a right curtain fabric of the curtain fabrics is provided inside the right outer tube, and the left middle cap and the right middle cap which are adjacently arranged are connected through the rotating mechanism;
   wherein the rotating mechanism comprises a button, a spring and a gear end cover,
   the left middle cap comprising a first round mounting boss protruding backward,
   the right middle cap comprising a second round mounting boss protruding backward,
   the first round mounting boss and the second round mounting boss are centrally arranged in forward and backward directions, mating end faces of the first round mounting boss and the second round mounting boss form an inner cavity,
   the first round mounting boss is provided with a first annular gear groove structure in a position corresponding to the inner cavity, and the second round mounting boss is provided with a second annular gear groove structure in a position corresponding to the inner cavity, the first annular gear groove structure and the second annular gear groove structure are centrally arranged in forward and backward directions to form an integral annular gear groove,
   the gear end cover is engaged in the integral annular gear groove, a gear of the gear end cover is meshed with the integral annular gear groove, the gear end cover comprises a thickness smaller than that of the first annular gear groove structure and the second annular gear groove structure,
   the spring is arranged between an inner end face of the gear end cover and an inner wall end face of the inner cavity, an outer end face of the gear end cover is provided with the button by press fit, the button is axially positioned in a button mounting guide slot of the first round mounting boss located at a rear portion, and a force application surface of the button is exposed.

2. The foldable and retractable covering curtain of claim 1, wherein a guide sleeve is arranged at a central axis position of the first round mounting boss, a central through hole is arranged in the guide sleeve, the guide sleeve is connected with an inner wall of the first round mounting boss through connecting ribs at two sides, a button stop ring is arranged at a rear end face of the first round mounting boss, a threaded sleeve pillar which protrudes backward is arranged at a central axis of the second round mounting boss, a threaded hole is arranged at a central hole position of the threaded sleeve pillar, the threaded sleeve pillar protrudes backward and thus is inserted into the central through hole of the guide sleeve, the gear end cover is sleeved on an outer ring surface of the threaded sleeve pillar, a bolt is threadedly connected with the threaded hole from back to front, and a head of the bolt is arranged closely abutting against a rear end surface of the guide sleeve.

3. The foldable and retractable covering curtain of claim 2, wherein an axial force applying ring of the button is provided with a long relief groove at a position corresponding to the connecting ribs, an outer end face of the axial force applying ring of the button protrudes laterally to form a stop strip, the stop strip has an outer diameter larger than that of the button stop ring, due to a presence of the long relief groove the stop strip is located at an inner end of the button stop ring after being pressed, and the stop strip is arranged closely abutting against the outer end face of the gear end cover.

4. The foldable and retractable covering curtain of claim 1, wherein the zipper mechanism comprises zipper tapes at two sides and a zipper head, wherein the zipper tapes are seamlessly connected with the facing sides of the curtain fabrics respectively, and the zipper head is pulled from outside to inside to close the zipper tapes at the two sides.

5. The foldable and retractable covering curtain of claim 4, wherein at least one end face of the left middle cap and the right middle cap facing the corresponding side tube that is between said each of said pair of side tube plugs is provided with a corresponding buckle, and an end of the zipper head is placed into the corresponding buckle when the curtain fabric is in the expanded state.

6. The foldable and retractable covering curtain of claim 1, wherein said each of said pair of side tube plugs comprises inner side tube plugs and outer side tube plugs, two of the inner side tube plugs are combined to form an integral connecting mechanism, and the facing sides of the curtain fabrics on both sides are clamped in two sides of the integral connecting mechanism, respectively.

7. The foldable and retractable covering curtain of claim 6, wherein a combined latch structure is arranged at a corresponding position of a front end face of the integral connecting mechanism, a latch of the combined latch structure is provided with a linear driving end which is used for opening the combined latch structure, so that the integral connecting mechanism is separated to form the inner side tube plugs which are independent of each other.

\* \* \* \* \*